United States Patent [19]
Kurtz

[11] 3,913,391
[45] Oct. 21, 1975

[54] STRAIN GAGE CONFIGURATIONS EMPLOYING HIGH DI-ELECTRIC STRENGTH AND EFFICIENT STRAIN TRANSMISSION

[75] Inventor: Anthony D. Kurtz, Englewood, N.J.

[73] Assignee: Kulite Semiconductor Products, Inc., Ridgefield, N.J.

[22] Filed: Apr. 22, 1974

[21] Appl. No.: 462,614

[52] U.S. Cl. .......................... 73/88.5 R; 73/88.5 SD
[51] Int. Cl.² .......................... G01N 3/00; G01B 7/18
[58] Field of Search .................. 73/88.5 R, 88.5 SD

[56] References Cited
UNITED STATES PATENTS

| | | |
|---|---|---|
| 2,621,276 | 12/1952 | Howland .......................... 73/88.5 R |
| 2,837,620 | 6/1958 | MacDonald ...................... 73/88.5 R |
| 3,084,300 | 4/1963 | Sanchez .......................... 73/88.5 R |
| 3,116,469 | 12/1963 | Wu .................................. 73/88.5 R |
| 3,800,264 | 3/1974 | Kurtz ............................. 73/88.5 SD |

Primary Examiner—James J. Gill
Assistant Examiner—Anthony V. Ciarlante
Attorney, Agent, or Firm—Arthur L. Plevy

[57] ABSTRACT

A high temperature and humidity operating strain gage employs piezoresistive elements which are glass bonded within a recess on a thin planar force transmitting member, which member is welded to a surface to be monitored such as a surface or a portion of an engine.

12 Claims, 6 Drawing Figures

STRAIN GAGE CONFIGURATIONS EMPLOYING HIGH DI-ELECTRIC STRENGTH AND EFFICIENT STRAIN TRANSMISSION

BACKGROUND OF INVENTION

This invention relates to strain transducers and more particularly to a gage configuration providing high di-electric strength.

Typically strain gages or pressure transducers are used to monitor the intensity of a force or torque applied to a variety of mechanical electrical, or chemical apparatus. The gages utilized are of various types and can be used as a single element or in a bridge configuration to provide a response proportional or related to the force to be measured.

Many such devices are used to monitor the forces or torques exerted upon mechanical components operating in difficult environments. As such the transducers or gages are exposed to large vibratory forces, high temperatures, high humidity and in general, severe environmental conditions.

A commonly used and extremely efficient gage arrangement utilizes the well-known piezoresistive effect.

Basically, the piezoresistive effect is accommodated by a semiconductor gage configuration, whose resistance varies according to a force or torque applied to a diaphragm or other member, upon which the piezoresistive gage is mounted.

The prior art has envisioned and implemented the mounting of such gages, on all types of different configuration mechanical members, by the use of the modern epoxy glues or epoxy bonding materials. It is desireable to mount the gage upon the structure to be monitored by as thin and as strong a bond as possible in order to permit the efficient transfers of force exerted on the structure to the gage. Epoxy materials have relatively good bonding characteristics and do permit fairly good strain or force transmission to the gage or transducer.

However, depending upon the environment in which the gage is operating to measure such forces or torques, one can and does experience great difficulty with the epoxy and other types of prior art bonds.

Thus assume one wishes to monitor torque or force exerted upon an internal combustion engine, a jet propulsion engine or some other similar type apparatus. In such systems heat and moisture are prevelant and the environmental conditions are quite severe.

Since such structures employ high operating temperature metal alloys, the gages usually have to be coupled to such metal parts. This as indicated can be accomplished with high temperature epoxy bonds.

These factors lead to various problems attendant with decreased performance of the gage as well as destruction of the same under such adverse conditions.

For example, since the piezoresistive element is a semiconductor and since it usually has a voltage applied thereto to determine changes in resistance according to Ohm's Law, the element must be isolated from the metallic part it is bonded to. Hence one requires a high isolation resistance, between the gage and the metal during all modes of operation and under all environmental conditions. In a high humidity environment, moisture permeates the epoxy which causes an electrolytic reaction. This causes a decrease in the isolation resistance as the impedance or resistance of the epoxy bond when permeated with moisture decreases. Furthermore, the electrolytic reaction depletes or reacts with the lead insulation causing shorts and breakdown of the apparatus. Furthermore, as the epxoy is permeated with more moisture, it weakens and eventually the bond loosens, thus exerting uneven and extraneous forces on the gage causing substantial effects and errors in the resistance of the gage.

Other bonding techniques as using glass bonds and so on applied directly to the engine parts are not practical. Actually the major disadvantage of bonding a gage by means of a glass bond to a metal engine part is extremely difficult to accomplish because of the size, shape and thickness of the engine or other part to be monitored.

In any event, utilizing glass as a bonding agent has increased advantages because of the facts that it is impervious to moisture, it has an extremely high di-electric strength, and posesses excellent strain transmission characteristics. Thus, if one utilized a glass bond the resulting transducers used in the above-described environments would withstand a high humidity without degrading of the bond while possessing reliable strain transmission and increased isolation resistance.

Therefore it is an object of the present invention to provide a piezoresistive strain gage configuration employing a glass bond and structure adapted to be positioned on any desired shaped metal part which is to be monitored as to applied force or torque.

BRIEF DESCRIPTION OF PREFERRED EMBODIMENT

A transducer apparatus is of the type employing at least one piezoresistive element fabricated from silicon, the element is glass bonded within a recess located upon the surface of a thin planar member having a temperature coefficient compatible with the glass bond and the silicon. The assembly thus provided is secured to a surface to be monitored by means of a spot weld.

DETAILED DESCRIPTION OF FIGURES

Before proceeding with a detailed description of the invention a few comments will be made in regard to the overall characteristics of piezoresistive elements.

The piezoresistive effect has been employed in semiconductor devices to construct force transducers with enhanced output and operating frequencies. The effect was originally measured in silicon and germanium by Smith, 1953 Physical Review, Volume 94, Number 1.

The early work dealt mainly with the longitudinal piesoresistance effect until W. G. Phann and R. N. Thurston of Bell Telephone Laboratories, published a paper entitled "Semiconducting Stress Transducers Utilizing the Transverse and Shear Piesoresistance Effects" (1961) Bell Telephone System Monograph 4056.

This paper discusses various uses of the transverse and shear characteristics including application of the same as torque transducers, load cells, and so on.

The monograph includes mathematical equations in regard to the effect and operating characteristics.

Essentially the effect has been in widespread use and has resulted in semiconductor gages of great utility, small size and reliability as compared to their mechanical counterparts.

Figure 1A:
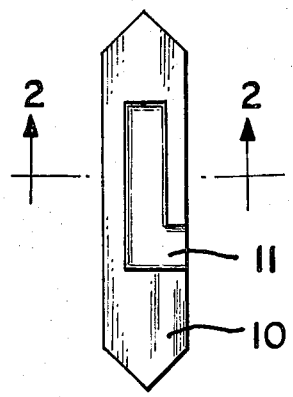
FIG. 1A is a front elevational view of a shim member according to this invention.

Referring to FIG. 1A there is shown a thin planar member or shim 10 fabricated from a metallic material having a low temperature expansion coefficient, which is also compatible with the semiconductor piezoresistive element to be mounted thereon. An example of a suitable material which operates accordingly is KOVAR. Basically, Kovar is a high temperature steel alloy. Kovar was originally developed to match the thermal coefficient of expansion of a sealing glass used in transistor packaging and it has a thermal coefficient of expansion of $47 \times 10^{-7}$. Kovar is basically a ferromagnetic material and as such possesses good compatibility with glass seals.

Figure 1B:
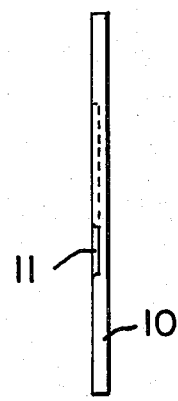
FIG. 1B is a side view of the member of FIG. 1A.
Figure 2:
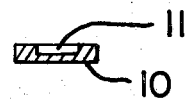
FIG. 2 is a cross-sectional view of the shim of FIG. 1A taken through line 2—2 of FIG. 1A.

The shim 10 thus fabricated from Kovar has a central L-shaped recess portion 11 which serves as a reservoir or a glass accommodating area. A side view of the shim 10 is shown in FIG. 1B and a cross sectional view through line 2—2 is shown in FIG. 2.

The shim 11 is provided as shown by a photoetching process. The recess 11 is also used, as will be explained, to accurately locate and position the piezoresistive gages to be mounted therein.

While the exact dimensions of the Kovar shim 10 may vary depending upon application, a typical shim or member 10 (FIG. 1A) has a length from tip to tip of the triangular shaped end sections of about 0.190 to about 0.22 inches, a width of about 0.060 to 0.070 inches and a thickness of about 0.005 inches.

The width of the recess 11 is about 0.030 inches wide and about 0.110 inches long. The depth of the recess is about 0.001 inches ± 0.0005 inches.

Thus, as one can ascertain, the shim 10 is very thin and quite small and hence, is fabricated by a photoetching process.

The recess 11 serving to contain the molten glass during processing and to accurately locate the piezoresistive elements.

The shim 10 should be as long as possible and as thin to present a good surface area to allow for efficient and maximum strain transfer.

Figure 3:
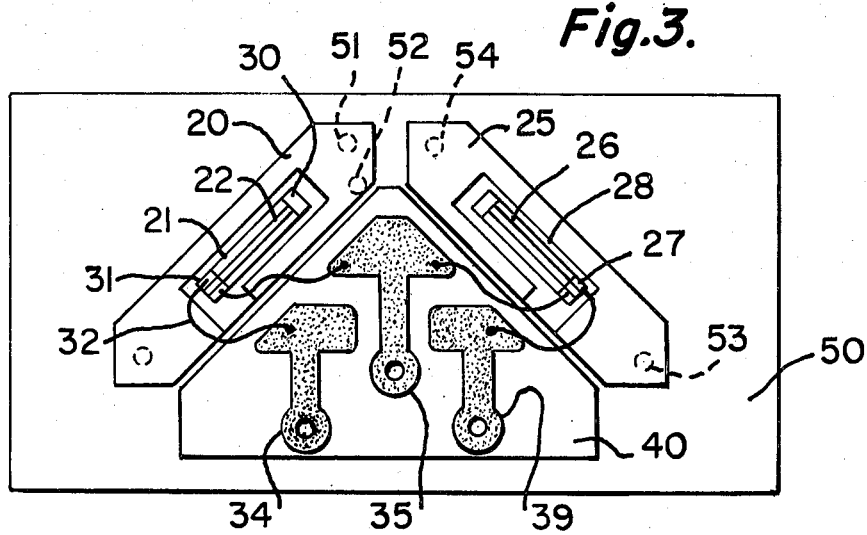
FIG. 3 is a front elevational view depicting a transducer assembly mounted upon a partial surface of an engine part.

FIG. 3 shows a shim 20 having mounted within the recess two strain gages 21 and 22 each being a piezoresistive element fabricated from a suitable semiconductor as silicon or germanium or another suitable material. Silicon gages are preferred due to their higher temperature capabilities. Another shim member 25 is also shown positioned at a predetermined angle with respect to the shim 20. The shim 25 also has two gages 26 and 27 positioned within the accommodating recess 28 of the shim 25.

The gages 21, 22, 26 and 27 are provided with platinum contact areas shown at both ends at the darkened portions. For example, gage 21 has a contact area 30 and a contact area 31 as does each gage. The gage 21 is connected to gate 22 at one end and the other ends are brought out via leads 32 and 33 respectively to terminal areas 34 and 35 which are metallized terminals deposited or positioned upon a triangular-shaped ceramic substrate 40.

In a similar manner the gages 26 and 27 are also connected together at one end and are connected to the terminal areas 35 and 39 on the ceramic substrate 40 via the leads 41 and 42. The assembly is mounted on the part in flexure so that an applied torque yields a position and negative strain.

Figure 4:
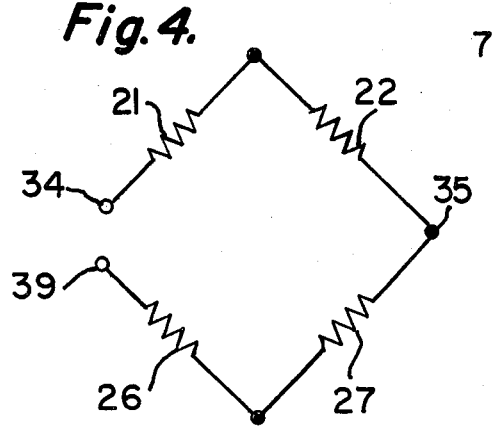
FIG. 4 is a schematic circuit diagram of the gage configuration afforded by the configuration of FIG. 3.

The attendant circuit configuration is shown in FIG. 4 with the same numerals retained for the gages and the same numerals retained for the terminal areas 34, 35 and 39 on the ceramic substrate 40. As one can see, the arrangement is that of a bridge configuration, where each arm of the bridge comprises a piezoresistor whose resistance varies as a function of an applied torque or force.

Referring again to FIG. 3 it is seen that the shims 20 and 25 as well as the ceramic substrate 40 are all positioned and secured to a metal area designated generally as 50. Actually, area 50 comprises part of an engine assembly operating under high temperature and humidity conditions. The gages are positioned at the shown angles or orientation to permit the bridge circuit of FIG. 4 to provide a response proportional to an applied or developed torque impressed on or generated by the required part 50. The part 50 may be a rocker arm of an engine, a piston rod and so on. In any event, in the prior art the gages would be epoxy bonded to the part 50 and hence be subjected to the above described disadvantages.

In this instance the gages, as will be explained, are bonded to the shims 20 and 25 by means of a glass bond and are positioned and secured within the shim recesses. The shims are spot welded to the engine part 50 by means of a conventional welding technique at areas such as 51, 52, 53 and 54 shown dashed. The welding assures an extremely efficient strain transfer from the part 50 to the shims and hence to the gages. This is so as the shims are long and thin and the welds assure continuity of the shim and part surfaces to permit efficient strain or force transfer; the welds may be implemented at both ends of the shims 20 and 25 and along the sides to assure a good bonding or coupling.

It is understood that a weld as compared to an epoxy bond is an extremely strong and reliable bond and alleviates temperature expansion problems as the weld is formed from identical materials used in the engine part and the shim.

Figure 5:
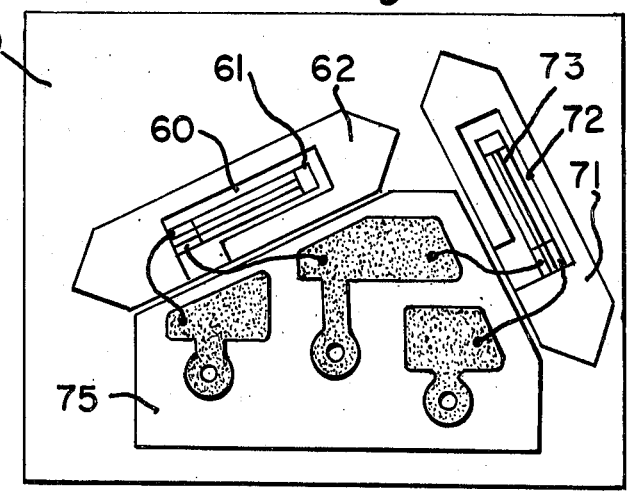
FIG. 5 is a front elevational view of an alternate embodiment of a transducer assembly.

FIG. 5 shows an alternate shim arrangement comprising piezoresistors 60 and 61 glass bonded to a shim 62 spot welded at a predetermined angle to an engine part 70. Another shim 71 has piezoresistive elements 72 and 73 glass bonded within the recess. The shim 71 is also spot welded to the part 70 at another predetermined angle for measuring torque or force applied at these angles to the part 70. A ceramic substrate 75 has terminal locations thereon for accommodating connections to the piezoresistive elements or for applying proper biases and operating potentials to the bridge configuration formed as well as connecting monitoring equipment to display or indicate the changes in resistance as voltage or current levels.

The assemblies are produced by the following methods:

The thin planar Kovar shims are fabricated by a photoetching process. The angled extremeties of the shims are implemented to permit closer spacing and positioning of the same on the engine part. The piezoresistive gages are formed of silicon and are provided with platinum or another high temperature non-corrosive contact material to withstand the relatively high temperatures of the bonding process, to be described, as well as the temperatures of the operating environment. The Kovar shims as pre-etched include the centrally L-shaped recesses necessary to positively locate the gages and to retain the molten glass during the bonding process.

The Kovar shim is then abraded to insure an effective bond by roughening the recess surface to increase the effective bonding area. A glass powder suspended in an organic fluid is placed on the shim and flows into the recess. The glass powder used, for example, is a solder glass as pyroceram 89 manufactured by the Corning Glass Company. This glass has a relatively low melting point and good mechanical properties at high temperatures (600° F).

Pyroceram 89 is a vitreous, crystallizing material which devitrifies during curing. Heating the glass to a temperature above the softening point causes the glass to flow, and as the heating is continued, crystals nucleate and grow. The rate of crystal growth is temperature dependent and higher temperatures produce faster growth. Upon reheating (even to temperatures above the initial curing cycle), the solder glass remains stable. Therefore such glasses are stronger than vitreous types with the same softening point.

Hence the powdered glass is placed within a fluid such as methyl-cellulose acetate which merely acts as a suspension vehicle. The piezoresistive gages with their platinum contacts are then "floated" on the frit or the mixture of the powdered glass and suspension fluid. A pre-heat cycle evaporates the fluid, the shim is now heated further (450° F) to form an amorphous layer between the shim and the gage and at the "floated" position within the glass containing recess. The assembly is cooled and the gage is placed on the glass and heated to 450° C to form a bond. The bonded gage resistances are then measured and the gaged shims are sorted into matched sets. The isolation resistance between the gage and shim as afforded by the glass bond is also measured.

The engine part is abraded at the location where the shim is to be welded to it. This location can be ascertained and accurately defined by an optical measuring system. Once located, the shim is spot welded, as shown in FIGS. 3 and 5 at the desired angle and located to the abraded area of the engine part. The ceramic substrate or terminal accommodating assembly is then epoxy bonded, between the shims as shown in FIGS. 3 and 5 and in close proximity to the same to provide as minimal an area as possible for the entire assembly. Gold leads as wires 32 and 33 (FIG. 3) are then ball-bonded to the platinum gage electrodes and each lead as 32 and 33 is routed to the terminal areas as 34,35 and 39 (FIG. 3) of the ceramic substrate and ball bonded thereto.

One can then attach external wires to the terminals area of the substrate and check and perform gage resistance measurements. The gold leads are protected mechanically by coating them with a clear and flexible polyurethane coating which can be brushed on or otherwise coated on the gold leads.

The entire assembly after external leads are connected thereto, is a bridge configuration possessing the advantages above described.

The welded gages as mounted on a Kovar shim of approximately 0.200 inches by 0.060 inches by 0.005 inches thick with high temperature Kulite UEP-350-090 silicon gage glass bonded within the 0.001 deep recess, were spot welded to a engine rocker arm. Experimental results indicated an isolation resistance of greater than 1000 Megohms at 500 volts, the tension and strain voltages produced by the bridge upon application to the rocker arm of predetermined forces showed equivalent output levels as obtained with epoxy bonds, thus verifying good force transfer through the spot welded Kovar shim and glass bond.

Hence the major disadvantages of epoxy bonds have been circumvented by this new and unique structure.

I claim:
1. In combination,
   a. first and second piezoresistive elements, each having contacts on a first and second end thereof,
   b. a thin planar member fabricated from a metallic material having a temperature coefficient, substantially matching the temperature coefficient of said piezoresistive elements, said member having a piezoresistive accommodating recess on a surface thereof, said recess capable of accommodating a liquid frit,
   c. a glass bond securing said first and second piezoresistive elements within said recess of said planar member, with one of said contacts on an end of said first and second elements being connected together, said bond formed from a glass that devitrifies upon passing from a liquid frit stage to a solid stage,
   d. a substrate member having a plurality of terminal areas mounted thereon,
   e. a force effected member having a predetermined area of a surface thereof adapted to be monitored as to force intensity,
   f. first means for securing said thin planar member within said predetermined area whereby said piezoresistors are operative to measure said force,
   g. second means for securing said substrate member in close proximity to said thin planar member within said predetermined area, and
   h. means coupling said other contacts of said first and second piezoresistive elements to said terminal areas on said substrate to thereby form a force responsive circuit configuration within said predetermined area of said force effected member.

2. The combination according to claim 1 wherein said thin planar member is fabricated from Kovar.

3. The combination according to claim 1 wherein said piezoresistive elements are fabricated from silicon and said contacts are fabricated from platinum.

4. The combination according to claim 1 wherein said piezoresistive accommodating recess is L-shaped.

5. The combination according to claim 1 wherein said glass bond is implemented by means of a solder glass such as Pyroceram.

6. The combination according to claim 1 wherein said substrate member is fabricated from a ceramic material.

7. The combination according to claim 1 wherein said force effected member comprises a part of an engine.

8. The combination according to claim 7 wherein said first means for securing said thin planar member to said engine part comprises a plurality of spot welds.

9. The combination according to claim 1 wherein said second means for securing said substrate comprises an epoxy bond.

10. The combination according to claim 1 wherein said means coupling said other contacts to said terminal areas comprises gold wires coated with an insulating material such as polyurethane.

11. The combination according to claim 1, further including:
 a. third and fourth piezoresistive elements, each having contacts on a first and second end thereof,
 b. another thin planar member fabricated from a similar material as said planar member having a given temperature coefficient,
 c. a glass bond securing said third and fourth piezoresistive elements to said another thin planar member,
 d. means for securing said another thin planar member within said predetermined area whereby said third and fourth piezoresistors are also operative to measure said force, and
 e. means for coupling one of said contacts of each of said third and fourth piezoresistive elements to terminal areas on said substrate.

12. The apparatus according to claim 1 wherein said thin planar member is approximately 0.005 inches thick.

* * * * *